F. SMITH.

WAGON HOUND AND POLE BRACE.

No. 7,386.

Reissued Nov. 7, 1876.

Witnesses:
John Hayes Ridgely
J. H. Cole

Inventor:
F. Smith

UNITED STATES PATENT OFFICE.

FRIDOLIN SMITH, OF TIFFIN, OHIO.

IMPROVEMENT IN WAGON-HOUND AND POLE-BRACE.

Specification forming part of Letters Patent No. 69,716, dated October 8, 1867; reissue No. 7,386, dated November 7, 1876; application filed September 19, 1876.

*To all whom it may concern:*

Be it known that I, FRIDOLIN SMITH, of Tiffin, in the county of Seneca and State of Ohio, have invented certain new and useful Improvements in the Construction of Wagon-Hounds; and I do declare that the following is a full, clear, and exact description thereof, reference being had to the accompanying drawings, making a part of this specification, in which—

Figure 1:
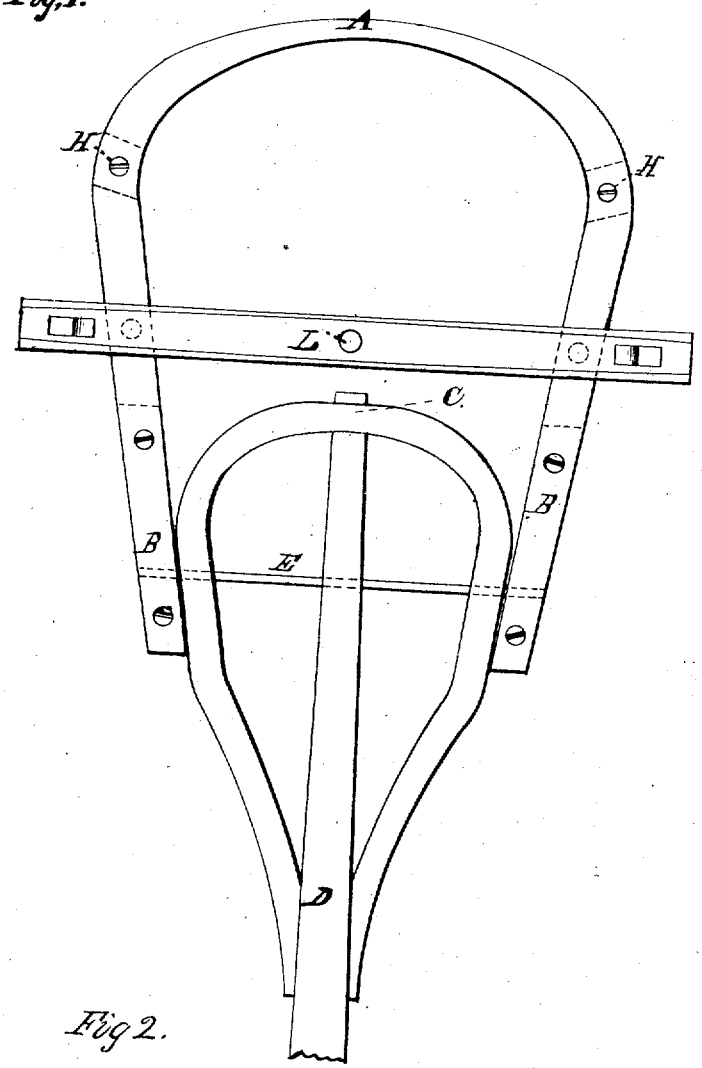
Figure 2:
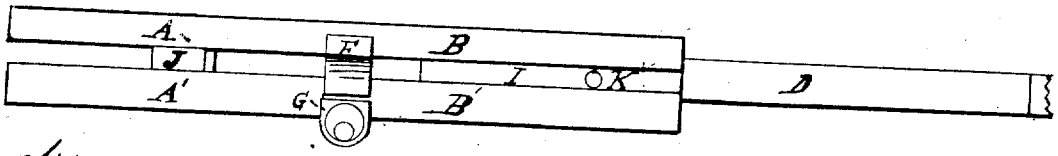

Figure 1 is a top view of the hounds. Fig. 2 is a side view of the same.

Similar letters of reference indicate corresponding parts in both figures.

My improvements consist, first, in bent hounds constructed thinner at the center or middle between the vertical walls than at the sides or ends between the vertical walls; second, in combination with bent hounds so constructed, a tongue-brace, for inclosing the tongue of a wagon; third, in hounds constructed of two bent strips, and provided with filling strips and blocks.

Prior to my invention bent wagon-hounds were constructed of the same thickness at the middle between the vertical walls as at the sides or ends between the vertical walls. This is not as it should be, because the greatest strength of the hounds is required at the points where they cross the axle, as the greatest strain is upon them at these points. The other portion of the hounds is merely a tie between the sides, and can be constructed much thinner, thereby giving, among other things, lightness and a better and neater appearance to the device in use.

In the drawings, A A′ is the middle of the hounds. B B B′ B′ are the sides or ends, which are fastened to the axle at two points. The part A′ is made considerably thinner than the parts B B B′ B′, by removing a portion from the inside or outside vertical wall or surface in any convenient manner, either before or after the bending operation.

In accordance with the second division of my invention I employ, in combination with the hounds, constructed as aforesaid, a tongue-brace, steamed and bent somewhat in the shape of the hounds themselves at the top; but the sides or ends are different, being carried forward and bent inward, as shown in Fig. 1, so that they can be brought up against the sides of the tongue D, and be firmly secured to it forward of its point of connection to the hounds by the coupling-rod E.

In proceeding to construct wagon-hounds according to the third division of my invention, I take two strips of wood of the required length and thickness, and subject them to the action of steam for a sufficient length of time, until the fibers of the wood are softened sufficiently to bend without breaking. The strips are then bent about a "form" by means of machinery suitably adapted for the purpose, and when dry the strips are ready for use. These bent strips or hounds are indicated in the drawing by the letters A B B A′ B′ B′. They together form the slider, or that portion through which the perch passes, and they also form the hounds, or those portions between which the tongue-brace and the tongue of the pole are pivoted. The lower and stouter part A′ B′ B′ of the bent strips or hounds is notched, so as to receive the bolster F and axle G upon opposite sides, and the upper portion, A B B, is notched, so as to receive the upper edge of the bolster. The strips or hounds and the bolster and axle are firmly secured together by means of bolts at H H, Fig. 1. Filling-strips I and blocks J are secured between the two bent strips or upper and lower members of the hounds, so as to stiffen and strengthen them, and keep them at the proper distance apart.

The filling-pieces I between the sides or ends B B and B′ B′ of said bent strips render these portions very solid and strong, and these strips receive through them the transverse coupling-rod K, by which the draft-tongue D is connected to the hounds. The blocks J, between the rear portions of the strips, form stops for the front running-gear in turning the wagon. Those portions of the bent strips which extend in rear of the axle-tree form what is denominated the "slider," and it will be seen by reference to Fig. 2 that this slider is double—that is to say, there is a strip above as well as below the perch, which latter is pivoted to the king-pin L, and extends back between said strips, forming the slider.

I claim—

1. Bent wagon-hounds constructed thinner at the middle between the vertical walls than at the sides or ends thereof, substantially as shown and described.

2. Bent wagon-hounds constructed thinner at the middle between the vertical walls than at the sides or ends thereof, in combination with a tongue-brace, substantially as described.

3. Bent wagon-hounds constructed of two bent strips, and provided with filling strips and blocks, substantially as described.

F. SMITH.

Witnesses:
J. H. RIDGELY,
J. H. COLE.